United States Patent
Yamamoto et al.

(10) Patent No.: US 6,912,063 B1
(45) Date of Patent: Jun. 28, 2005

(54) INK JET RECORDING APPARATUS

(75) Inventors: Kosuke Yamamoto, Yokohama (JP);
Hiroshi Nakai, Sagamihara (JP);
Shusuke Inamura, Hino (JP);
Masayuki Hongo, Yokohama (JP);
Kenichi Moriya, Urayasu (JP);
Manabu Yamazoe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1073 days.

(21) Appl. No.: 09/636,463

(22) Filed: Aug. 11, 2000

(30) Foreign Application Priority Data

Aug. 18, 1999 (JP) ............................................ 11-231335
Jul. 19, 2000 (JP) ...................................... 2000-218583

(51) Int. Cl.⁷ ............................................. G06K 15/00
(52) U.S. Cl. ...................................... 358/1.18; 358/1.1
(58) Field of Search .......................... 358/1.1, 1.3, 1.4, 358/1.8, 1.12, 1.13, 1.18, 453, 462, 1.6; 382/284, 282, 283

(56) References Cited

U.S. PATENT DOCUMENTS 4,723,129 A    2/1988  Endo et al.
4,740,796 A    4/1988  Endo et al.
5,436,981 A  * 7/1995  Ishikawa ..................... 382/173

* cited by examiner

*Primary Examiner*—Arthur G. Evans
(74) *Attorney, Agent, or Firm*—Fitzpatrick, Cella, Harper & Scinto

(57) ABSTRACT

An ink jet recording apparatus for recording by discharging ink from nozzles of a recording head to a recording medium comprises a figure recording control section for executing recording control of figure draw commands for ruled lines and other figures, and a bitmap recording control section for executing recording control of draw commands other than the figure draw commands by developing bitmaps. For this ink jet recording apparatus, draw commands are individually controlled by the recording control sections, respectively, and at the same time, recording is performed by relatively moving in the intersecting two directions a recording head for discharging ink by the draw commands, and a recording medium held by a recording medium holding unit in the position facing the ink discharge surface of the recording head. With the structure thus arranged, it becomes possible to materialize an ink jet recording apparatus which can output high quality images while neither creating deviating seams of ruled lines to the left or right nor creating black strips or white strips.

18 Claims, 14 Drawing Sheets

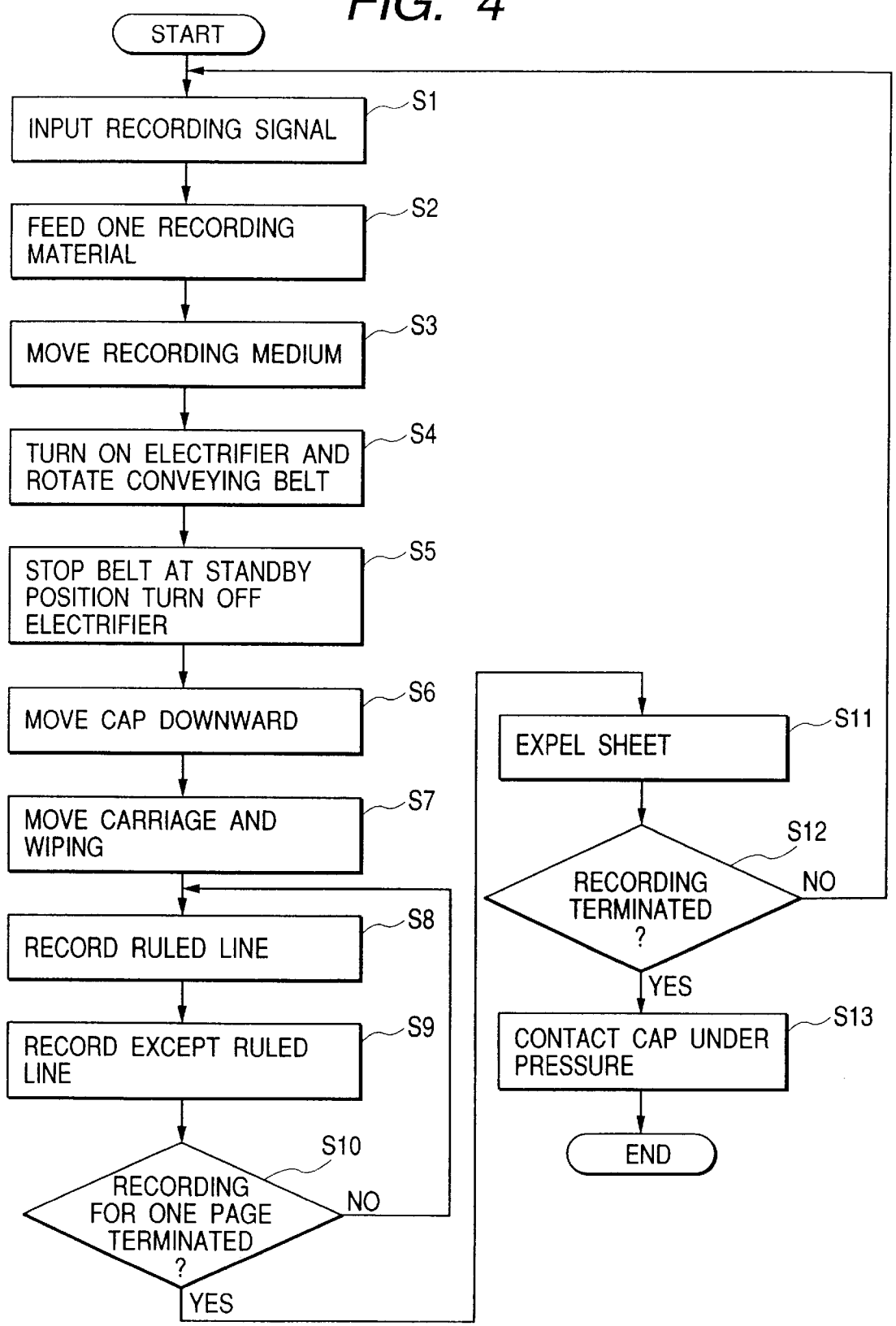

INK JET RECORDING APPARATUS

BACKGROUND OF THE INVENTION

1. Field of the Invention

The present invention relates to an ink jet recording apparatus that records by discharging liquid ink.

2. Related Background Art

Conventionally, the ink jet recording apparatus that records by discharging liquid ink has been known.

There are roughly two kinds of ink jet recording apparatuses. One is a recording apparatus of serial scanning type which is provided with a carriage having an ink jet head mounted thereon that scans to perform recording. The other is a recording apparatus of line type having a line type ink jet head fixed therein, which is provided with discharge nozzles to discharge liquid ink for recording on the width portion of a recording sheet while the recording sheet is carried immediately below the head.

For the serial scanning type recording apparatus, there has been a tendency in recent years that the length of the nozzle array is made as long as 0.5 to 1 inch so as to reduce the frequency of carriage scanning per recording sheet for faster recording.

Here, an ink jet head is almost made practicable with 300 to 600 nozzles which are arranged at a pitch of 1/600 inch or the like.

An apparatus of such kind comprises a printer controller that develops image data received from a host computer or the like into bitmap data, and converts them into recordable information; an engine control unit that controls each of functional units in the interior of a recording apparatus in accordance with commands or the like received from the printer controller; and each of the functional units that actuates each inner function of the recording apparatus.

Also, for the serial type recording apparatus that represents the ink jet recording apparatus, the bitmap data are developed per raster area at the time of output. Then the data are transmitted for the execution of recording.

Further, there has been widely in use the so-called flat-bed type scanner which reads images from a source document set on a source document stand. Typically, it has been used in such a way that the host computer fetches images thus read out and processes or edits them for outputting them to other recording apparatus or the host computer reads a preformatted sheet such as represented by a voucher, and after an input of numeral data or the like, it outputs them on the correct positions on such preformatted sheet.

For the conventional art described above, however, there are problems encountered as follows:

(1) As the serial scanning type recording apparatus forms images while repeating its carriage scans, there inevitably occur seams in the direction at right angles to the carrying direction of a sheet.

For example, when vertically ruled lines are recorded, these lines are deviated to the left and right at each seam, and the lines are disconnected to form serrations in some cases.

There are two causes for this occurrence. One is difference in carriage speeds for the first scanning and the scanning to follow, that is, uneven speed thereof, which may cause deviated impact positions of ink discharged onto a recording sheet. The other is brought about by the nozzle array, which is not fixed in the carriage correctly at right angles to the direction of the carriage scanning, or by the carriage itself, which may be inclined when the carriage scans. FIG. 15 shows the state where the ruled lines are diagonally connected in continuation.

Here, actually, the former example is rare. Even if the uneven speeds occur, there is almost no case that the unevenness in the first scanning speed is allowed to change in the one that follows. On the other hand, the latter examples are often encountered along with the tendency that nozzles are made in increasing numbers.

The angle of the head fixed in the interior of the carriage tends to be deviated from the correct position due to variations in the shape of the carriage or variations in the shape of the head. One deviation appears as an inclination of the nozzle array. The more nozzles that are multiply arranged, the larger the length L becomes in FIG. 15. A slight deviation of angle may cause a greater degree of serration when vertically ruled lines are recorded, and the appearance becomes unpresentable.

Also, when color recording is executed, color tones may change depending on the amount of deviation in the impact positions of one color ink and the other color ink. Therefore, when heads are arranged side by side, the amount of deviation in the impact positions is caused to differ on one edge side of a nozzle array and the other edge side thereof if the installation angle is different for each of the heads. Thus, the color tones may change to make the resultant images uneven in colors carried by them as a whole.

(2) As described earlier, the serial scanning type recording apparatus forms images by repeating the carriage scanning and recording sheet feeding. Thus, if the precision is not good enough for feeding the recording sheet, images are affected. In other words, if the feeding is shorter than the length of the nozzle array, images are overlapped to present higher density which becomes black lines. If, on the contrary, the feeding becomes longer, white lines are created inevitably.

In order to prevent them, there has been known the so-called multi-pass recording in which images are formed by feeding the recording sheet in an amount ½ or ⅓ of the length of the nozzle array. In this case, the length of the nozzles cannot be utilized fully, which obviously leads to a problem that throughput becomes lower.

Also, in order to suppress the degradation of images recorded by one pass to the extent that the human eye cannot discriminate it, there is a need for securing the precision of recording sheet feeding within an error of approximately ±15 µm. Also, the fluctuation of the sheet feed roller should be minimized; a special coating process should be given to the surface of the sheet feed roller so that the coefficient of the surface friction coefficient is made greater; and a motor having high rotational precision should be adopted or the power transmission gears should be made highly precise, among some others. These requirements result in a problem that the costs of parts become higher inevitably in every aspect.

(3) For the serial scanning type recording apparatus, the carriage scanning should be repeated many times in order to draw the vertically ruled lines as shown in FIG. 15. Here, the carriage reaches a constant speed after its acceleration period, thus eliminating the instability of speed for making highly precise impacts of ink on a recording medium. Ink is discharged at this constant speed. Then, the movement of the carriage is controlled to be suspended after its deceleration period. After that, the movement is reversed. As a result, the more frequent the scanning, the greater becomes the total of such deceleration period of time. The resultant recording time is made longer per page eventually.

Also, when color recording is performed by the heads arranged side by side, there is a need for adding the scanning distance equivalent to the total pitches of head arrays to the scanning distance needed for the black monochromatic recording. Therefore, the larger the pitches, the greater becomes the total scanning distance per page, and the recording time becomes longer accordingly.

(4) For the line type recording apparatus, no problem exists that corresponds to the aforesaid problems (1) to (3). However, if, for example, an apparatus that carries an A-4 sized sheet vertically should be used, it becomes necessary to arrange approximately 5,000 nozzles at a pitch of ⅟₆₀₀ inch. As a result, the cost of the ink jet head becomes higher in consideration of the anticipated unfavorable yield of manufacture. Particularly in the case of a color recording apparatus, the heads of plural colors, such as black, cyan, magenta, and yellow, should be arranged in parallel, and the costs are made higher still.

Also, for the head which should be made larger, the capping mechanism to prevent nozzles from being dried and the ink suction mechanism to recover the clogged nozzles are made larger accordingly, hence making it difficult to reduce the costs of manufacture and make the apparatus smaller as a whole.

(5) As a common problem that exists both for the serial type and line type recording apparatuses, there is a restriction imposed upon the usable kind of recording medium.

For the serial type recording apparatus, the area of the recording medium holding unit (the so-called platen) that faces the orifice surface of an ink jet head is rather limited. Therefore, a part of recording medium should be pinched by a pair of rollers or by a roller and a spur when recording is performed. Usually, the passage of the recording medium, which is formed by these rollers or guides, is not exactly on a straight line, but on a curved or zigzag line. As a result, a recording medium whose thickness is 1 mm or more, such as a CD-ROM or a piece of extremely hard cardboard, cannot pass such passage, thus making the execution of recording impossible.

In this respect, there are some apparatuses which are provided with a manual inlet port to make those recording mediums recordable, but drawbacks still exist such as to cause a recording medium to be folded or curled. Also, a recording medium whose surface is made glossy has a lower coefficient of friction with the rollers. The rollers tend to rotate idly so that the recording medium is not carried or the precision is extremely lowered even if it can be carried. These may bring about a problem that the quality of recorded images is degraded.

(6) If images should be processed before output as described earlier, there is a need for the provision of a scanner and a recording apparatus in addition to a host computer. Here, the problem is that this requires a larger installation area. Also, a flat-bed type scanner is not made to carry source documents automatically, which necessitates the user to place them one by one on the scanner. Therefore, it presents a problem that the operability becomes unfavorable when many sheets of source documents should be read.

SUMMARY OF THE INVENTION

The present invention is designed in consideration of the problems discussed above. It is an object of the invention to provide an ink jet recording apparatus capable of recording basic figures, such as ruled lines or circles, seamlessly at high speeds without making the apparatus larger.

It is another object of the invention to provide an ink jet recording apparatus capable of reading source document and capable of recording exactly even on a recording medium which cannot be folded.

It is still another object of the invention to provide an ink jet recording apparatus for recording on a recording medium by discharging ink from nozzles of the recording head, which comprises figure recording control means for controlling recording in accordance with commands for drawing ruled lines and other figures; and bitmap recording control means for controlling recording by bitmap development for the draw commands other than the aforesaid figure draw commands, and which performs recording control individually by each of the aforesaid recording control means in accordance with draw commands, at the same time, performing recording by relatively moving in the intersecting two directions the recording head for discharging ink in accordance with the aforesaid draw commands, and the recording medium held on a position to face the ink discharge surface of the recording head.

BRIEF DESCRIPTION OF THE DRAWINGS

FIG. 4 is a flowchart which shows the operation in accordance with the first embodiment.

DETAILED DESCRIPTION OF THE PREFERRED EMBODIMENTS

Hereinafter, with reference to the accompanying drawings, description will be made of the embodiments in accordance with the present invention.

First Embodiment

Figure 1:
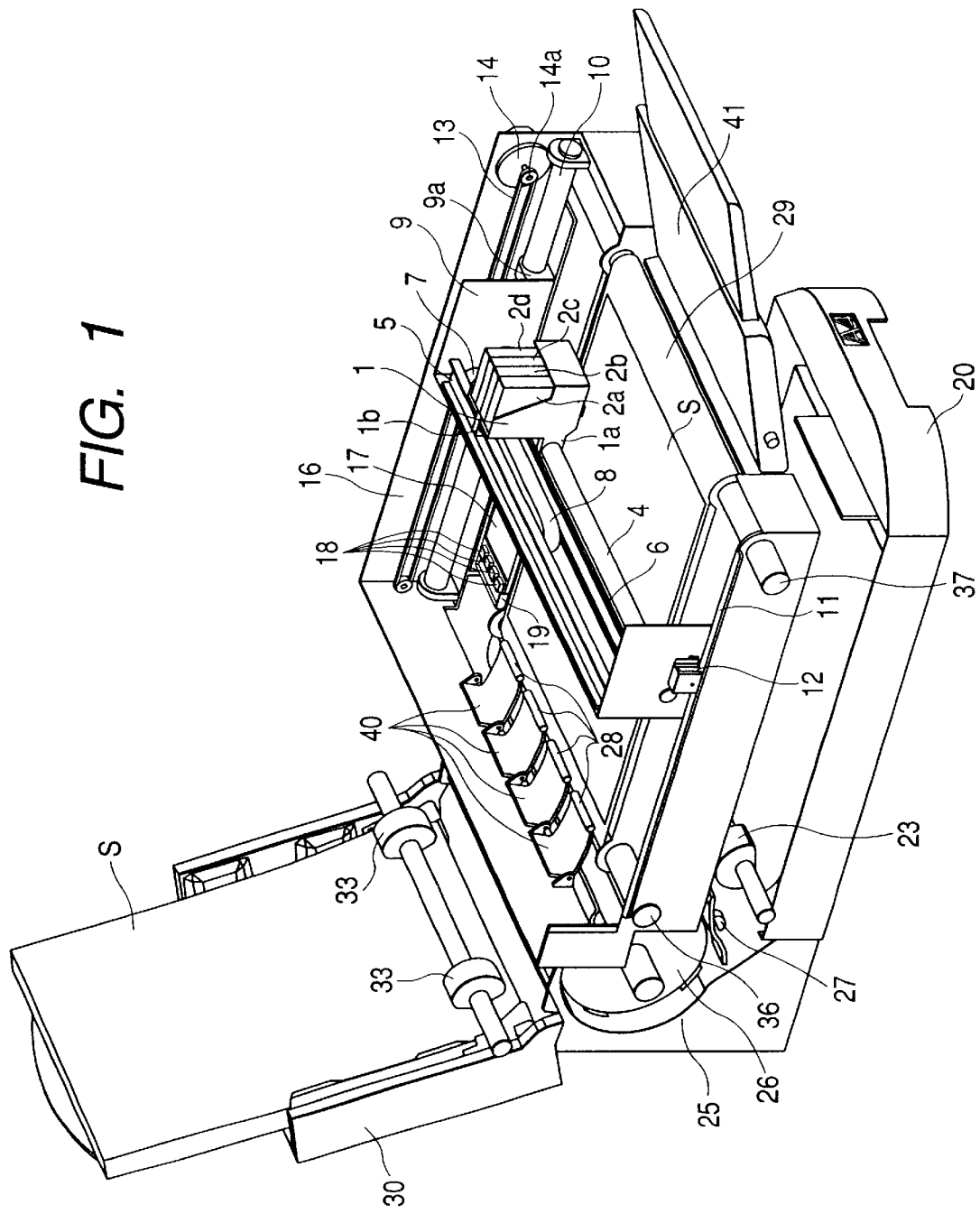
FIG. 1 is a perspective view which illustrates the entire body of an apparatus in accordance with a first embodiment.
Figure 2:
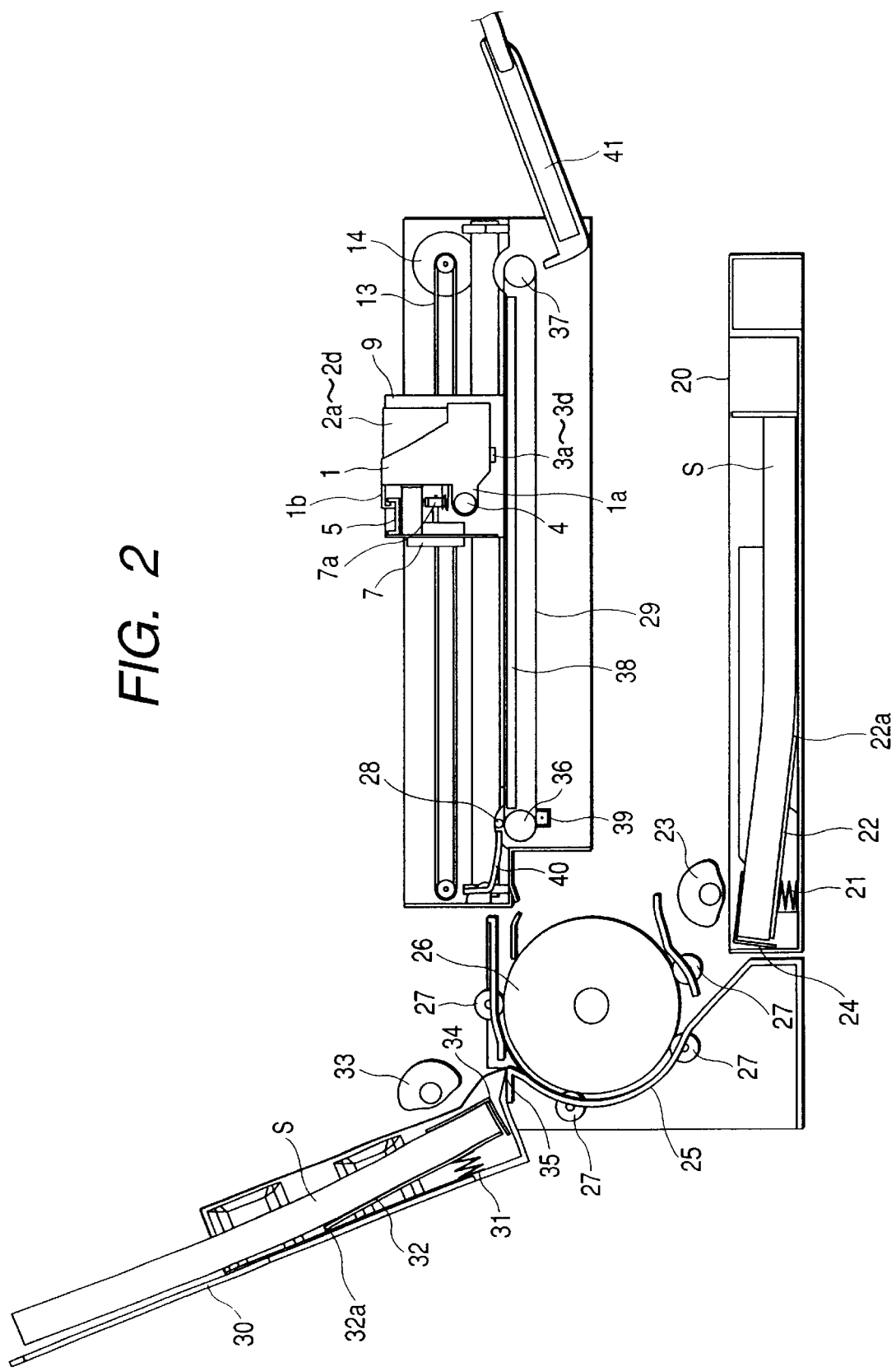
FIG. 2 is a sectional view which illustrates the apparatus in accordance with the first embodiment.

FIG. 1 is a perspective view which illustrates the entire body of an ink jet recording apparatus in accordance with a first embodiment of the present invention. FIG. 2 is a vertical sectional view which illustrates the apparatus cut on the center of the roller on the most front side among the four pinch rollers 28 shown in FIG. 1.

(Carriage and Frame Structure)

In FIG. 1 and FIG. 2, a reference numeral 1 designates a carriage, and inside the carriage, ink tanks 2a to 2d and ink jet heads 3a to 3d can be installed to be described later. For the carriage 1, a bearing 1a is integrally formed, and a carriage guide shaft 4 penetrates this bearing 1a. The upper guide 1b of the carriage 1 is guided by the carriage guide rail 5 which extends in the same direction as the longitudinal direction of the carriage guide shaft 4. The carriage 1 can reciprocate, while being supported by the carriage guide shaft 4 and the carriage guide rail 5. To this carriage 1, an endless belt 6 is fixed. One end of the belt 6 is tensioned around the motor pulley 7a which is fixed to the shaft of a carriage motor 7. The other end thereof is put around a tension pulley (not shown) and provided with a specific tension. When driving the carriage motor 7, the carriage 1 can reciprocate. A reference numeral 8 designates a carriage cable. It functions to transmit electric signals from the main body base plate (not shown) to the ink jet heads 3a to 3d.

The carriage guide shaft 4, the carriage guide rail 5, the carriage motor 7 and the tension pulley are fixed to a carriage frame 9. For the carriage frame 9, a carriage frame bearing 9a is integrally formed, and inside the frame, the carriage frame guide shaft 10, which extends in the direction intersecting the carriage carrying direction, is arranged to penetrate the bearing. On the side opposite to the carriage frame guide shaft 10, a carriage frame guide rail 11 exists. Then, the carriage frame guide roller 12 which is installed on the carriage frame 9 rolls on the upper surface of this guide rail.

In this manner, the carriage frame 9 is made movable in the direction intersecting the reciprocating directions of the carriage 1, while being supported by the carriage frame guide shaft 10, and the carriage frame guide rail 11. Further, a carriage frame belt 13 is fixed to the carriage frame 9. One end of this belt 13 is tensioned around the motor pulley 14a fixed to the carriage frame motor 14, and the other end thereof is put around a tension pulley 15 and provided with a specific tension. By driving the carriage frame motor 14, the carriage frame 9 can reciprocate. The carriage frame guide shaft 10, the carriage frame guide rail 11, the carriage frame motor 14, and the tension pulley 15 are fixed to a station frame 16.

(Structure of Recording Head)

Figure 3:
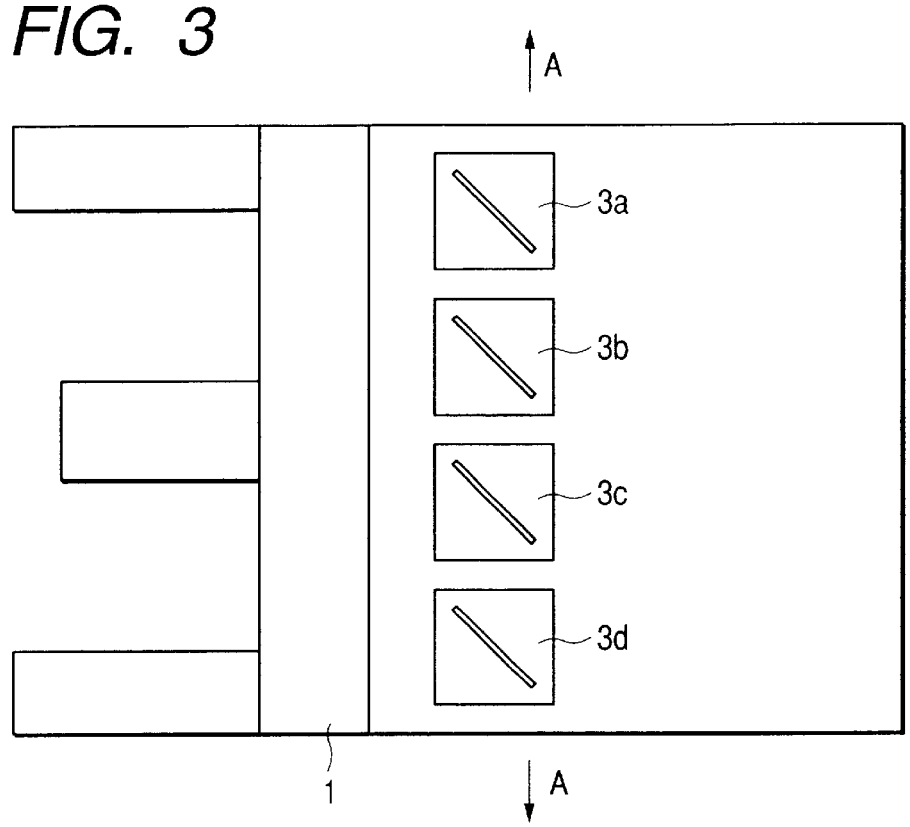
FIG. 3 is a view which illustrates the head in accordance with the first embodiment, observed from the orifice surface.

Here, in conjunction with FIG. 3, description will be made of ink jet heads 3a to 3d, that is, recording heads fixed inside the carriage 1. FIG. 3 is a view which illustrates the carriage 1, observed from the lower face (orifice face side), and reference numerals 3a to 3d designate the ink jet heads that discharge black, cyan, magenta, and yellow ink, respectively. As shown in FIG. 3, each of these heads is provided with a plurality of discharge nozzle arrays at an angle of 45 degrees to the carriage reciprocating directions (directions indicated by arrows A and A). In accordance with the present embodiment, the nozzle pitch is $1/600$ inch$\times 2^{1/2}$, and the number of nozzles is 300 for use. In other words, nozzles are arranged to be $1/600$ inch=42.3 $\mu$m with respect to the reciprocating directions of the carriage 1, and the reciprocating directions of the carriage frame 9.

On the carriage 1, the ink tanks 2a to 2d are detachably mountable. Inside the ink tanks 2a to 2d, inks of black, cyan, magenta, and yellow are contained, respectively, and ink is supplied to each of the ink jet heads 3a to 3d through ink paths (not shown).

Inside the nozzles of the ink jet heads 3a to 3d, discharge heaters (not shown) exist, and when the heaters are selectively energized, film boiling is created in ink, which is utilized to generate bubbles for discharging ink.

As regards the typical structure and principle thereof, it is preferable to adopt the fundamental principle disclosed in the specification of U.S. Pat. No. 4,723,129 and that of U.S. Pat. No. 4,740,796, for example.

Here, in FIG. 1, reference numeral 17 designates a recovery unit, which comprises four rubber caps 18 for use of four colors to prevent ink inside the nozzles of the ink jet heads 3a to 3d from clogging them due to dried ink, and wiper 19 which maintains discharges in good condition by removing ink adhering to the orifice surface of each head. The caps 18 are made capable of being in contact with and retracted from each orifice surface of the heads by means of an ascent and descent mechanism (not shown). The wiping operation is executed by moving the carriage 1 from the cap position to the opposite side of the cap after the carriage frame 9 shifts to the position where the orifice surface of each head abuts against the wiper 19.

(Structure for Carrying Recording Medium)

Now, a description will be made of the structure to carry a recording medium to the recording position and expel it from the recording position.

As shown in FIG. 2, inside the lower part of the apparatus, a cassette 20 is installed to stock recording mediums S. Inside the cassette 20, there is a pressure plate 22 which is biased by a pressure spring 21 to rotate upward centering on fulcrum 22a. At the time of feeding, the pressure plate 22 shifts upward to allow the surface of the recording medium S to be in contact with the surface of a feed roller 23. Then, when the feed roller 23 rotates clockwise in FIG. 2, the recording medium S is carried, and separation nail 24 separates one sheet to be picked up. One sheet of the recording medium S thus picked up is guided through a U-turn guide 25 to advance along the surface of a U-turn roller 26, while being pinched by the U-turn roller 26 and plural guide rollers 27, and pinched by four pinch rollers 28 and a carrier belt 29. At this juncture, the pressure plate 22 shifts downward, and the feed roller 23 and the recording medium S are allowed to part from each other.

On the other hand, an automatic sheet feeder 30 is installed near and above the U-turn roller 26. On the surface thereof, recording mediums S are set. Inside the automatic sheet feeder, a pressure plate 32 exists, and is biased upward by means of a pressure plate spring 31 to rotate centering on fulcrum 32a. At the time of feeding, the pressure plate 32 shifts toward the recording medium, and the surface of two feeding rollers 33 and the surface of the recording medium S are in contact with each other. When the feed rollers 33 rotate counterclockwise in FIG. 2, the recording medium S is carried, and separation nail 34 separates one sheet of recording medium S to be picked up. The picked up one sheet enters feeding inlet 35 of the automatic sheet feeder, and is pinched by the U-turn roller 26 and guide roller 27 to advance. Then, it is pinched by the four pinch rollers 28 and the carrier belt 29. At this juncture, the pressure plate 32 shifts in the direction opposite to the recording medium, and the feed rollers 33 and the recording medium S are allowed to part from each other.

(Holding and Expelling Structure for Recording Medium)

The carrier belt 29 functions as recording medium holding means. The carrier belt 29 is a seamless belt specially arranged with a high resistive layer of 50 $\mu$m thickness (approximately 10 Ω•cm) formed on the surface thereof. Both end portions of the carrier belt 29 are tensioned around the carrier belt driving rollers 36 and 37. With the carrier belt driving roller 37 on the downstream side, a motor (not shown) is connected to enable the carrier belt 29 to rotate. Also, the reverse side of the carrier belt 29 is supported by the belt supporting plate 38 to keep the flatness of the surface of the belt.

A reference numeral 39 designates an electrifier to charge the surface of the carrier belt 29 at 1,500 V. The inner side of the carrier belt 29 is grounded by way of the carrier belt driving rollers 36 and 37. Then, when the surface of the carrier belt 29 is charged, the recording medium S is adsorbed or attracted to the carrier belt 29, thus holding the recording medium S.

The pinch roller 28 is axially supported to rotate by a pinch roller holder 40 at both ends thereof. The pinch roller holder 40 is biased by means of a pinching spring (not shown) in the direction to press the pinch roller 28 to the surface of the carrier belt 29. The recording medium S is pressed by the pinch roller 28 to the carrier belt 29 and adsorbed to the belt, thus being carried to the recording position where it stops at the position of the recording medium S shown in FIG. 1.

In this state, the carrier 1 and the carriage frame 9 are driven to scan, and at the same time, the ink jet heads 3a to 3d discharge in accordance with image signals to record on the recording medium S. Then, after recording, the carrier belt 29 again rotates to expel the recording medium S to a receiving tray 41 by means of curvature separation on the upper part of the carrier belt driving roller.

In this respect, by use of control means (not shown), each of the members described earlier is controlled so that each of them operates as shown in a flowchart in FIG. 4 to be described later.

(Operations)

Now, with reference to a flowchart shown in FIG. 4, the operation of the apparatus will be described. When recording signals are received (STEP S1), the pressure plate 22 located below shifts upward so that the recording medium S and the feed roller 23 are in contact with each other, thus one sheet of the recording mediums S is fed (STEP S2). The U-turn roller 26 rotates clockwise in FIG. 2 to pinch the recording medium S with the U-turn roller 26 and the guide roller 27 to be carried (STEP S3). In continuation, voltage is applied to the electrifier 39. The carrier belt 29 rotates clockwise simultaneously (STEP S4). The recording medium S is pinched by the pinch roller 28 and the carrier belt 29, and adsorbed to the charged carrier belt 29. The carrier belt 29 is driven continuously as it is. Then, when the recording medium S is carried to the position of the recording medium S shown in FIG. 1 (hereinafter referred to as the recording standby position), the carrier belt 29 stops, and the electrifier 39 is turned off (STEP S5). Here, the position of the recording medium S is controlled as detected by a paper sensor or the like which is arranged in the vicinity of the outlet port (not shown) of the U-turn roller 26. In this respect, when the recording medium is carried, the ink jet heads 3a to 3d are capped by caps 18 to protect the nozzles.

Then, when the recording medium S arrives at the recording standby position, the caps 18 part from the orifice surface of the ink jet heads 3a to 3d (STEP S6), and the carriage 1 moves in the direction from the capping position to the location where the recording medium is set. Thus, wiping is executed (STEP S7).

Next, it is determined whether or not the basic figures, such as ruled lines or circles, exist among the image signals. If ruled lines are signaled, the ruled line recording is executed (STEP S8). In other words, for drawing the horizontally ruled lines, the carriage frame 9 shifts to the recording position of the horizontally ruled lines. Then, ink is discharged while the carriage 1 scans. When horizontally ruled lines should be recorded further, the carriage frame 9 shifts per 300 nozzle unit (0.5 inch) to execute the same operation.

On the other hand, when vertically ruled lines are drawn, the carriage 1 shifts to the recording position of vertically ruled lines, and ink is discharged while the carriage frame 9 is driven to scan. If vertically ruled lines should be recorded further, the carriage 1 shifts per 300 nozzle unit (0.5 inch) to execute the same operation.

When the ruled lines are recorded in this way, both horizontally and vertically ruled lines can be obtained seamlessly in high quality. Then, after the completion of ruled line recording, characters, images, and the like other than the ruled lines are recorded (STEP S9). At this juncture, whether ink is discharged while the carriage 1 scans or ink is discharged while the carriage frame 9 scans is decided by selecting the one having the faster recording speed depending on images.

In this way, when recording is completed for one page portion (STEP S10), the carrier belt 29 rotates clockwise to expel the recording medium S to the receiving tray 41 (STEP S11).

If the second sheet should be recorded continuously (STEP S12), the process is repeated beginning with the STEP S1. If the recording should terminate, the carriage 1 and the carriage frame 9 move to bring the ink jet heads 3a to 3d to the capping position. Then, the caps 18 are raised to keep them in contact with the orifice surface (STEP S13).

Here, when recording should be made on a CD-ROM, a piece of cardboard, a plastic plate, or the like, which cannot be fed from the cassette 20, the operation is performed as given below. At first, the kind of recording medium is designated by use of the host computer if it is a fixed type recording medium. Then, the carrier belt 29 rotates, and stops in the position where the frame marked on the belt comes to the upper face of the carrier belt so that it matches with the outer shape of the fixed recording medium.

The recording standards are also marked in the same manner as the frame. Then, if the recording medium is not the fixed one, the recording area should be designated by use of the host computer, and at the same time, the edge of the recording medium is set to be in agreement with such standard marking.

Here, a transmission type photosensor (not shown) used for detecting the belt position is installed at the edge of the carrier belt 29 to control the phases of the belt by detecting the position of the carrier belt 29 with the holes provided for the position of the carrier belt 29 that matches with the optical axis of such sensor.

The user places a fixed type recording medium by matching it with the frame or places a non-fixed type recording medium by matching it with the corresponding standard recording mark. After that, recording command is transmitted to enable the ink jet heads 3a to 3d to shift to the appropriate position for the execution of the recording process described above. When recording is completed, the ink jet recording heads 3a to 3d shift to the capping position. The user removes the recording medium.

As recording is possible with a recording medium placed exactly on a flat surface, it is easier to set the recording medium without any danger that it is folded.

Also, for the nozzle structure, it is not necessary to incline them at an angle of 45 degrees as in the present embodiment. Any one of the structures, such as an L-shaped type or a cross-shaped type, that has two parallel nozzle arrays in the scanning direction of the carriage 1 and the scanning direction of the carriage frame 9, respectively, may be suitably adoptable if only it has a recording width in each of the directions.

(Printer Driver Process)

Now, description will be made of the printer driver process. Conventionally, for a system of such kind, the printer driver rasterizes a draw command of the draw command group inputted from the OS, and develops the raster image on the RGB 24 bit-page memory.

However, if any page memory is not available due to the restriction imposed upon the memory or if it is not needed, recording is made by transferring data with the bitmap development per raster region by dividing one page into plural bands when output in the case of the serial type recording apparatus which represents the ink jet recording apparatus, for example.

Then, a masking process, a gamma correction process, a quantizing process, or the like is performed per pixel in accordance with the color reproducing capability of a printer to produce the CMYK data dependent of the printer characteristics, and the data is transferred to a recording apparatus.

In this way, when all the draw commands are rasterized for the bitmap development, it should be sufficient if only the draw commands are processed for the bitmap development one after another from the most significant draw command with respect to the rasterized draw commands. However, if recording should be executed per draw command as in the present embodiment, it is necessary to store the overlapped portions of the draw commands themselves.

Figure 5:
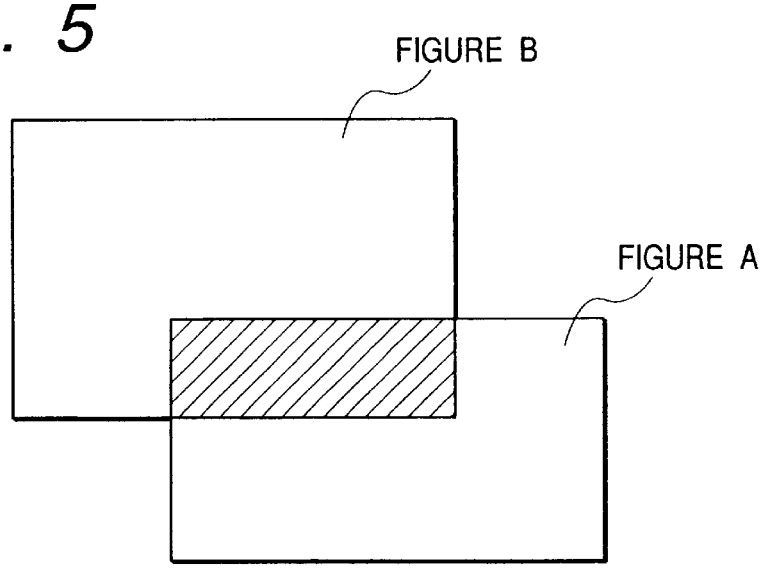
FIG. 5 is a view which illustrates the figures which are overlapped.

For example, in a case where a figure B is on a figure A as shown in FIG. 5, the overlapped portion (indicated by slanted lines) is not allowed to be recorded if the figure A is recorded after the figure B has been recorded. Therefore, it is necessary to calculate the overlapped portion of a figure to be drawn with the figure which has been drawn previously, and transmit the data to the recording apparatus on a figure from which the overlapped portion thus calculated is omitted. More specifically, since the process becomes more complicated as the number of figures is increased, it is best to secure the memory area for one-page portion. For example, when an A4-sized recording sheet should be recorded with a resolution of 600 dpi, it is possible to write "1" as the information of an 8 pixel-portion by 1 byte that indicates "yet to be processed" or "0" that indicates "processed" if only the process information is needed to indicate whether or not the recording has been executed. Actually, therefore, a memory of 11.7 [inch]×8.3 [inch]× 600×600/8≅4.3 M bytes (hereinafter referred to as the "process area memory") is needed per A-4 size. However, if the actual portion of superposition should only be calculated, a resolution of 300 dpi will suffice to serve the purpose. Then, it is essentially good enough to secure approximately 1 M byte as a process area memory for this operation.

Moreover, with the storage of "1" to indicate "yet to be processed" and "0" to indicate "processed" on the record position writing means as described above, it becomes possible to secure an area to make recording for a certain draw command at high speeds with ease by operating AND to such area to make recording on, and the aforesaid process area memory.

Here, for the present embodiment, there are provided draw command separation means that analyzes the data on the page to be recorded, and separates the figure draw commands contained on such page, and draw commands other than those commands, and also, the page memory that serves as memory means for storing bit information to indicate whether the positions, where recording is made by each of the draw commands, are recorded or not. Then, the structure is arranged so that recording data are transferred one after another for all the draw commands beginning with the significant data, and as to the positions to be recorded by each of the draw commands, the means for writing recorded positions which writes on the page memory the recorded information is compared with the information of the recorded positions on the page memory one after another for each of the draw commands, and that control is made so as to perform no recording on the area where recorded positions already exist. Here, in the aforesaid memory means, all the bit information is initialized at "1", and the recorded area is stored as "0", and then, AND is operated with the area to be drawn by each of the draw commands so that control is made not to record on any area where recording has been already made.

Figure 6:
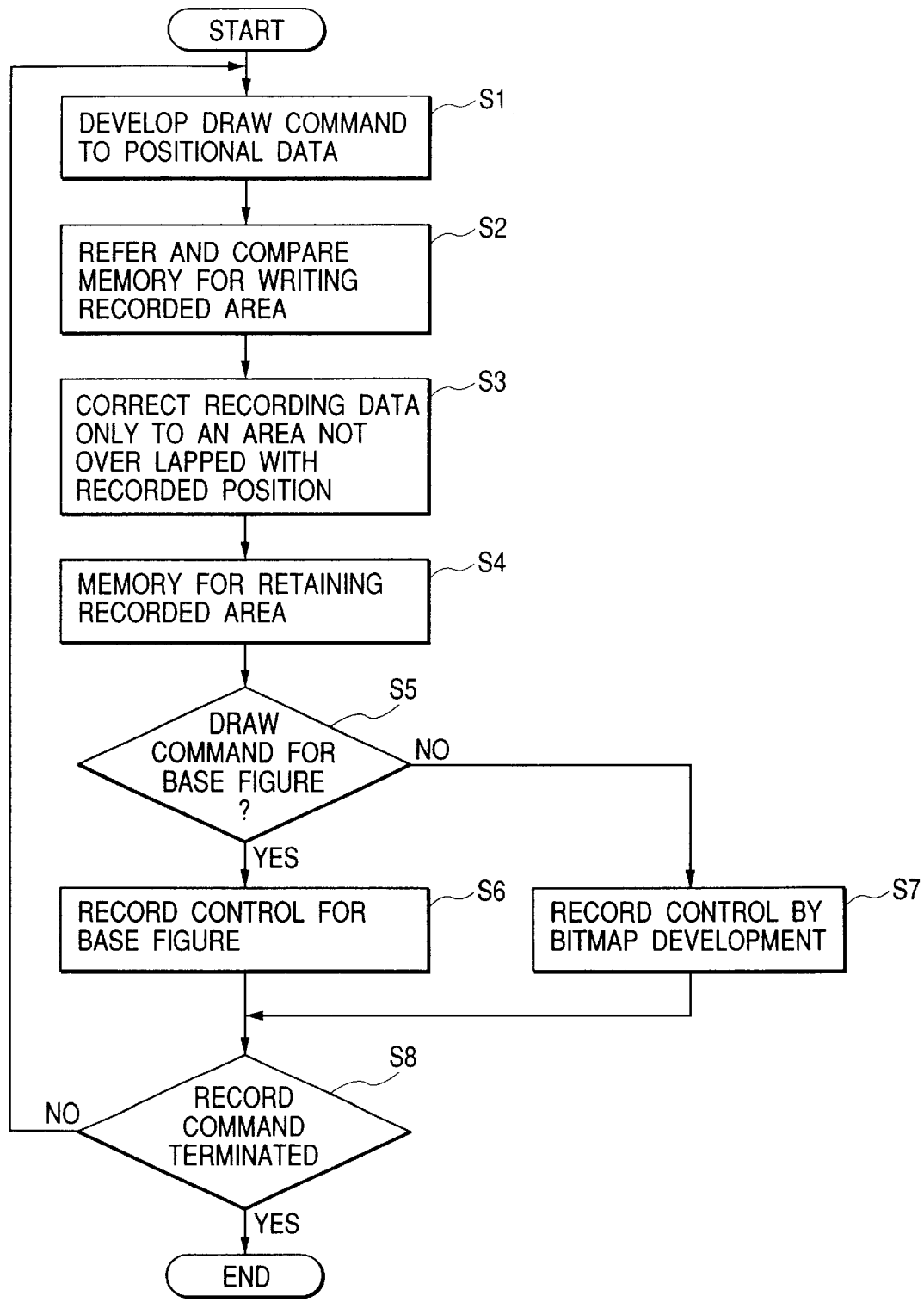
FIG. 6 is a flowchart which shows the printer driver process.

In other words, as shown in FIG. 6, process is made for each of the draw commands within a page one after another in the order of significance thereof. The draw command is developed into the positional information (STEP S1). The recorded position storing memory is referenced for comparison (STEP S2). The draw command is modified by subtracting the already recorded area from the aforesaid draw command (STEP S3), and written anew on the recorded position storing memory (STEP S4). Then, whether or not the aforesaid draw command is for drawing basic figures is determined (STEP S5). If the draw command is to draw the basic figures, such as ruled lines or circles, the recording is controlled by means for drawing basic figures (STEP S6). If the command is to draw other than the basic figures, such as character data, it is developed into the bitmap by means of bitmap recording control means to control recording (STEP S7).

Then, it is determined whether or not process has been made for all the draw commands (STEP S8). If there is still any draw command to be processed, the process returns to the STEP S1 to repeat the processes, and then, when all the draw commands are processed, the recording process terminates.

As described above, for the basic figures, such as ruled lines or circles, it is possible to obtain the result of high quality recording at high speed for each by recording in the direction of the straight lines or curved lines. Also, with the references made for the overlapped portion of each of the draw commands to the aforesaid process area memory as described above, it becomes possible to prevent the amount of ink from being consumed excessively or to prevent draw commands from being overlapped, hence obtaining the result of recording in the same condition as the conventional one.

In the way as described above, it becomes possible to record images in high quality even when ruled lines are attached thereto, because both vertically and horizontally ruled lines can be recorded without any seams.

Second Embodiment

Figure 7:
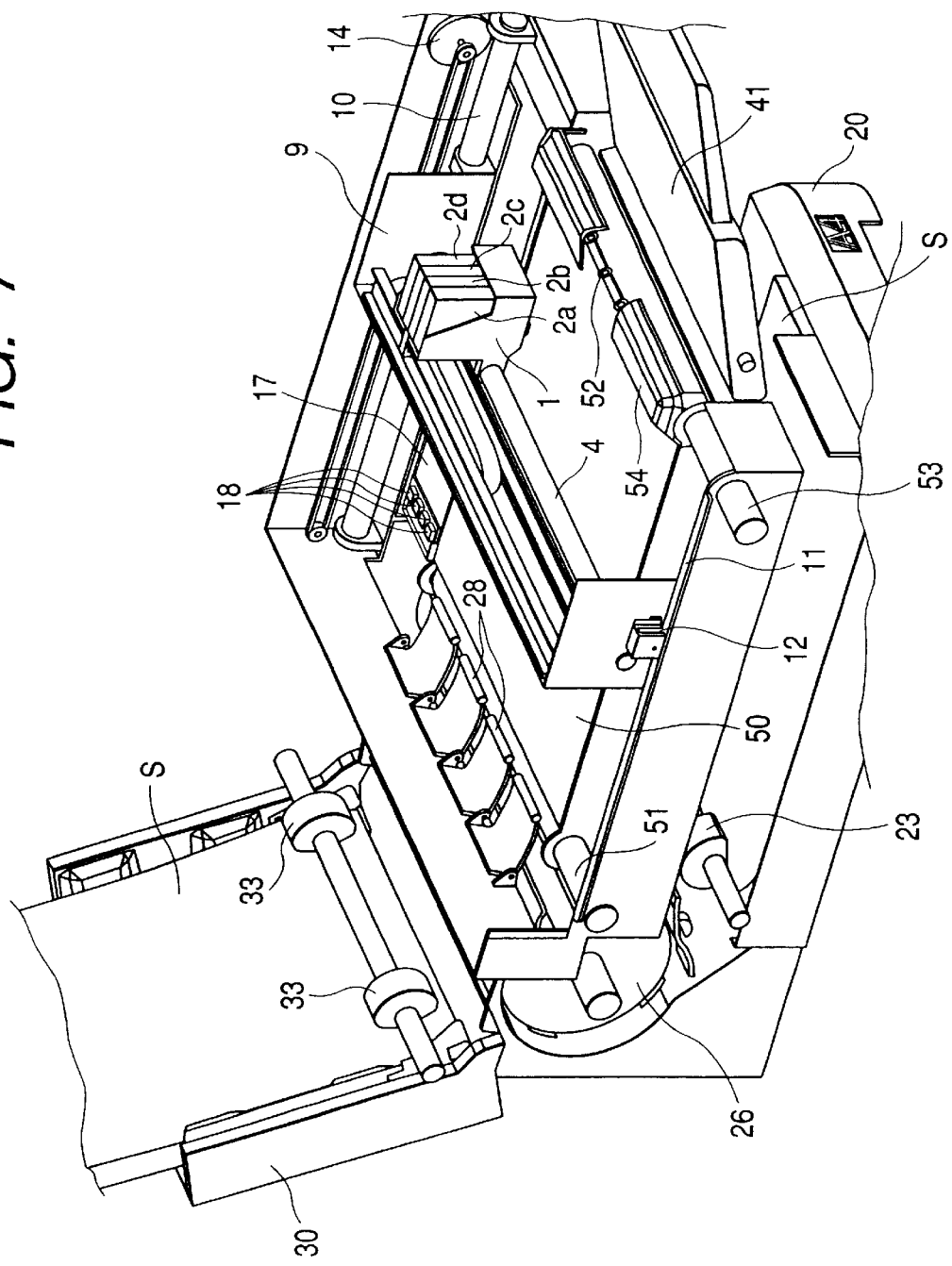
FIG. 7 is a perspective view which illustrates the entire body of an apparatus in accordance with a second embodiment.
Figure 8:
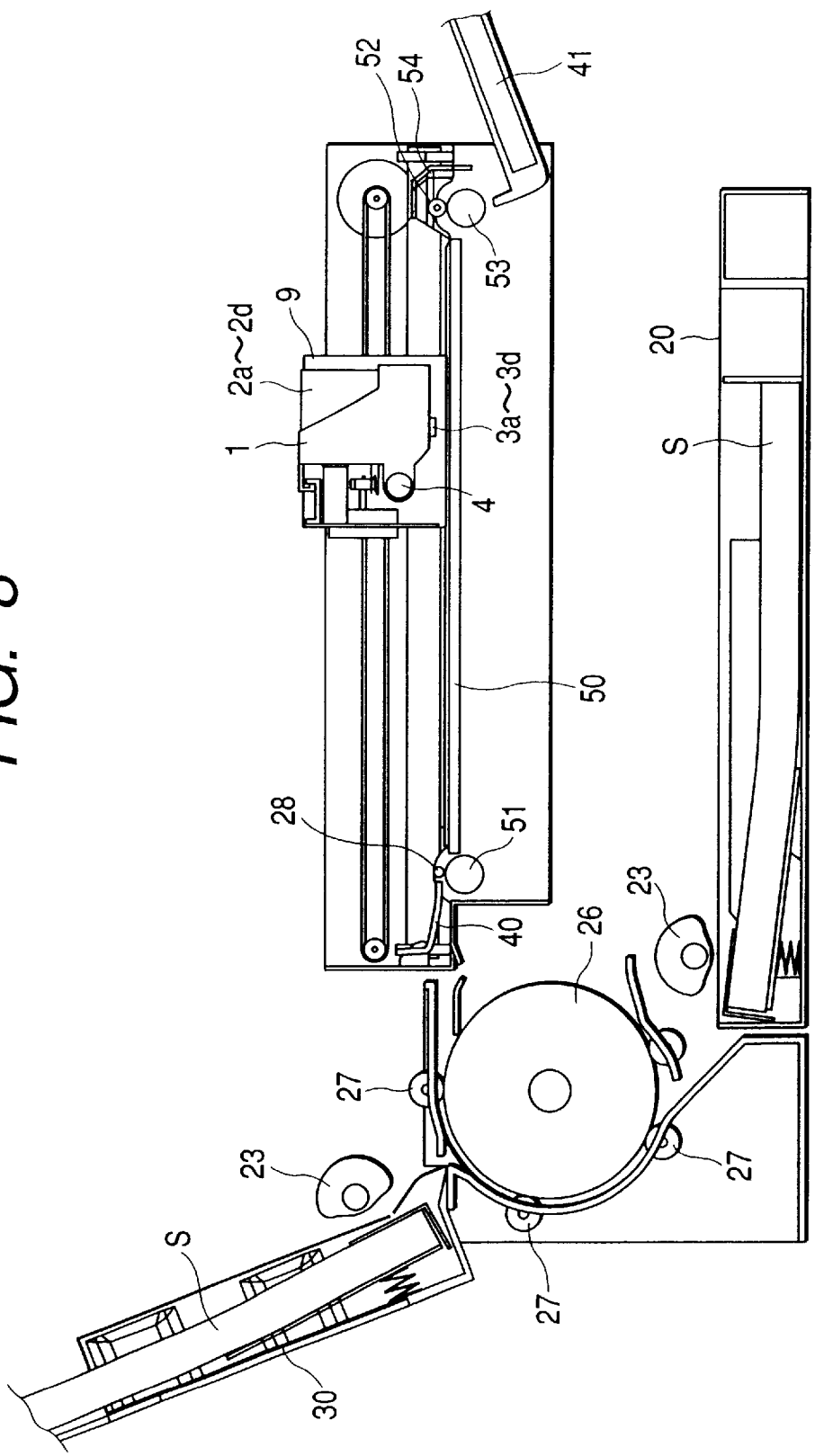
FIG. 8 is a sectional view which illustrates the apparatus in accordance with the second embodiment.

FIG. 7 is a perspective view which illustrates the entire body of an apparatus in accordance with a second embodiment. FIG. 8 is a sectional view thereof. Here, the description will be made focusing on what differs from the first embodiment.

For the second embodiment, the carrier belt described for the first embodiment does not exist. A stage 50 is provided as means for holding a recording medium. Then, the recording medium S that has passed a U-turn roller 26 is pinched by a driving roller 51 and a pinch roller 28 to be carried, thus moving on the surface of the stage 50. Here, a reference numeral 52 designates spurs which follow the rotation of a driving roller 53. Each spur 52 is star-shaped, and each tip thereof is a sharp edge so that it does not rub and stain images even when the recording medium with recorded images passes the spurs. Ten spurs 52 are rotatively fixed on a stay 54 extended in the width direction of a recording medium, and each of them is pressed to the driving roller 53 under a pressure of 10 g. Then, when the leading end of a recording medium S is pinched by the driving roller 53 and spurs 52, the driving roller 53 is suspended.

In this state, the recording is performed, while the carriage 1 and the carriage frame 9 are driven to scan as in the first embodiment. When the recording of one page portion is completed, the driving rollers 51 and 53 are driven to expel the recording medium to the receiving tray 41.

In accordance with the present embodiment, there is no need for the provision of the carrier belt 29 for adsorption use and the electrifier 39 so as not to increase the size of the apparatus. Therefore, a simpler structure thereof can be materialized. However, since the positions of the spurs 52 are fixed, it is impossible to expel the recording medium whose length is smaller than the distance between the pinch rollers 28 and the spurs 52. Nevertheless, it is not very inconvenient for the user who stocks A4-sized sheets in the cassette 20 as the recording medium S all the time, for example. Here, the apparatus rather presents such advantages as the lower costs of manufacture itself, and no electric power needed for use of electrification which may contribute to reducing the running costs thereof.

Third Embodiment

For the first and second embodiments, recording is performed by making the carriage frame 9 movable for scanning, but the invention is not necessarily limited to that arrangement. It may be possible to arrange the structure so that a stage is made movable as means for holding a recording medium.

In this case, the stage 50 can scan in the direction intersecting the feeding direction of the recording medium S by use of the U-turn roller 26 described in the first and second embodiments. Then, it is arranged to deliver the recording medium almost in the center of the scanning range. The direction of carriage scans is arranged to be in parallel to the sheet feeding and carrying direction.

With the structure thus arranged, there is no possibility that the feeding and carrying means which are formed by the U-turn roller 26 and the U-turn guide 25 interferes with the stage at the time of scanning. As a result, the apparatus can be also made smaller.

Fourth Embodiment

Figure 9:
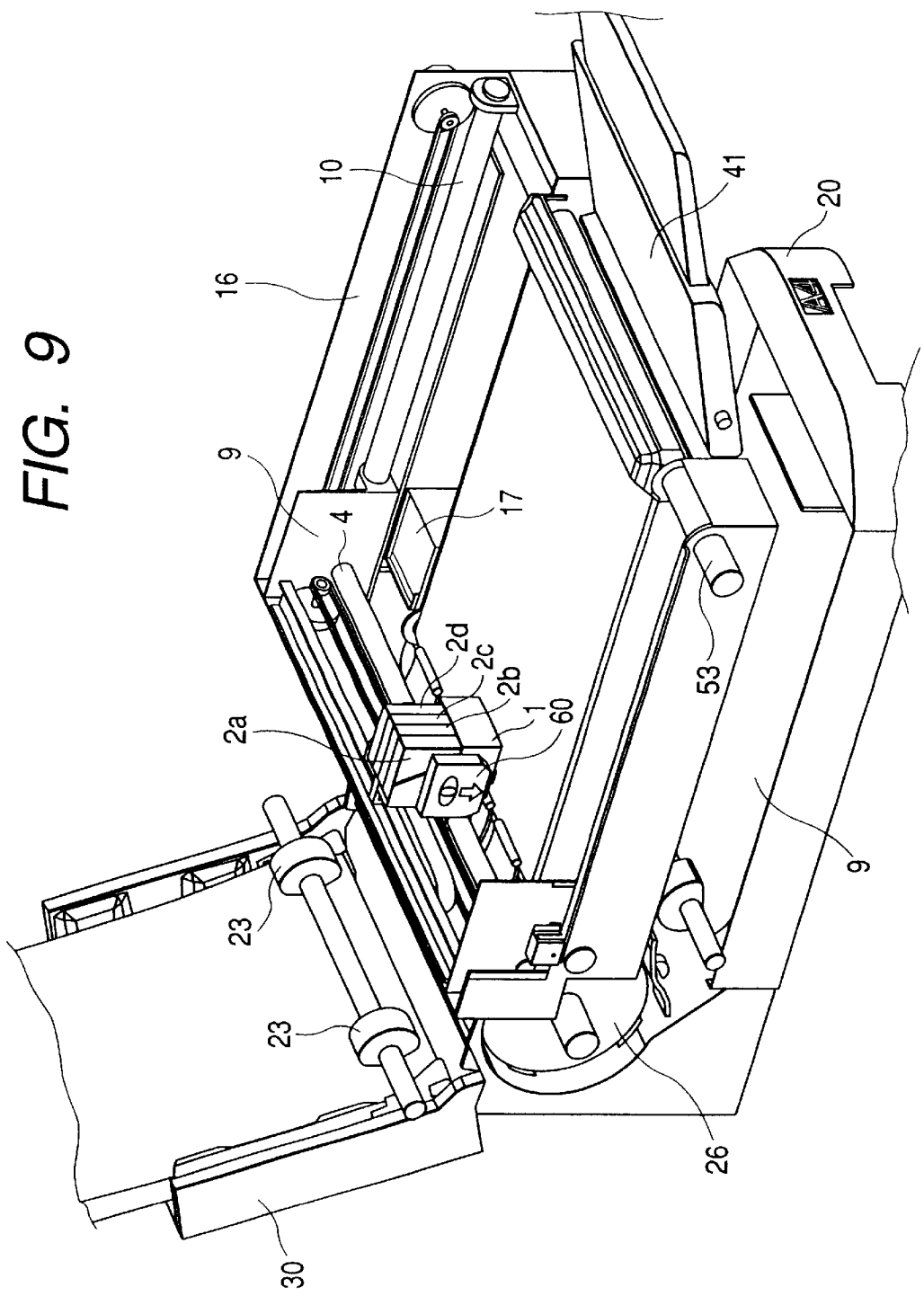
FIG. 9 is a perspective view which illustrates the entire body of an apparatus in accordance with a fourth embodiment.

FIG. 9 is a perspective view which shows the entire body of a recording apparatus in accordance with a fourth embodiment. Here, the description will be made of the parts which differ from those of the second embodiment. In FIG. 9, a reference numeral 60 designates a scanner that serves as image reading means, having CCD devices in the interior thereof. For example, 300 devices are arranged at a pitch of $\frac{1}{600}$ inch in the carrying direction of a recording medium, making it possible to read the images on a source document on recording medium holding means. The scanner 60 is installed on a carriage 1.

Figure 10:
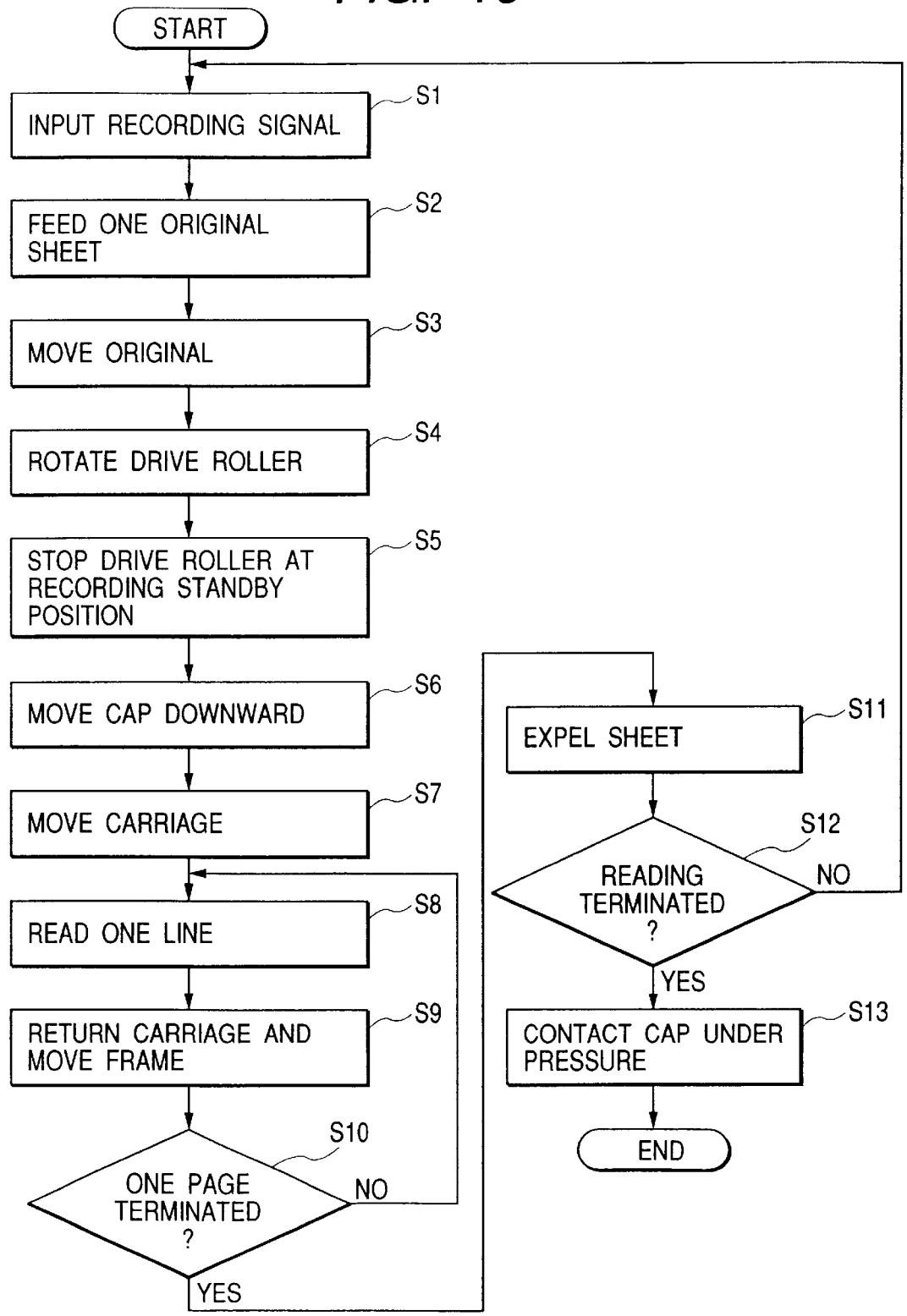
FIG. 10 is a flowchart which shows the operation of the apparatus in accordance with the fourth embodiment.

Now, in conjunction with a flowchart shown in FIG. 10, the description will be made of the source document reading operation. When reading a source document, the user sets the source document on the surface side of the cassette 20 or an automatic sheet feeder 30. When the automatic sheet feeder 30 is used, the source document is set with its printed surface up. When the cassette 20 is used, the source document is set with its reverse side up.

Here, the cassette feeding is described. When image reading signals are received (STEP S1), the pressure plate 22 which is located below shifts upward to enable a source document G and the feed roller 23 to be in contact, thus feeding out one source document G (STEP S2). The U-turn roller 26 rotates clockwise, and the source document G is pinched by the U-turn roller 26 and the guide roller 27 to be carried (STEP S3). In continuation, the driving rollers 51 and 53 are driven (STEP S4). The source document G is pinched by the pinch roller 28 and the driving roller 51 to be carried. Then, when the leading end thereof is pinched by the driving roller 53 and spurs 52, the driving rollers 51 and 53 are suspended (STEP S5). Here, the position of the source document G is detected and controlled by a paper sensor or the like (not shown) installed in the vicinity of the outlet port of the U-turn roller 26. At this juncture, the ink jet heads 3a to 3d are capped by caps 18 to protect the nozzles.

When the source document G arrives at the read standby portion, the caps 18 are retracted from the orifice surface of the ink jet heads 3a to 3d (STEP S6). The carriage 1 shifts from the capping position in the direction toward where the source document G is set (STEP S7). The carriage 1 scans as it is to read out one-line portion of the source document (STEP S8). Then, the carriage 1 returns to the opposite side, and at the same time, the carriage frame 9 shifts to the downstream side by a portion of 300 pixels (½ inch) (STEP S9). When the reading of one-page portion terminates (STEP S10), the sheet is expelled (STEP S11). If reading terminates (STEP S12), the carriage 1 returns to the capping position to press the caps to be in contact (STEP S13). If the second page should be read, the operation repeats beginning with the STEP S1.

Figure 11:
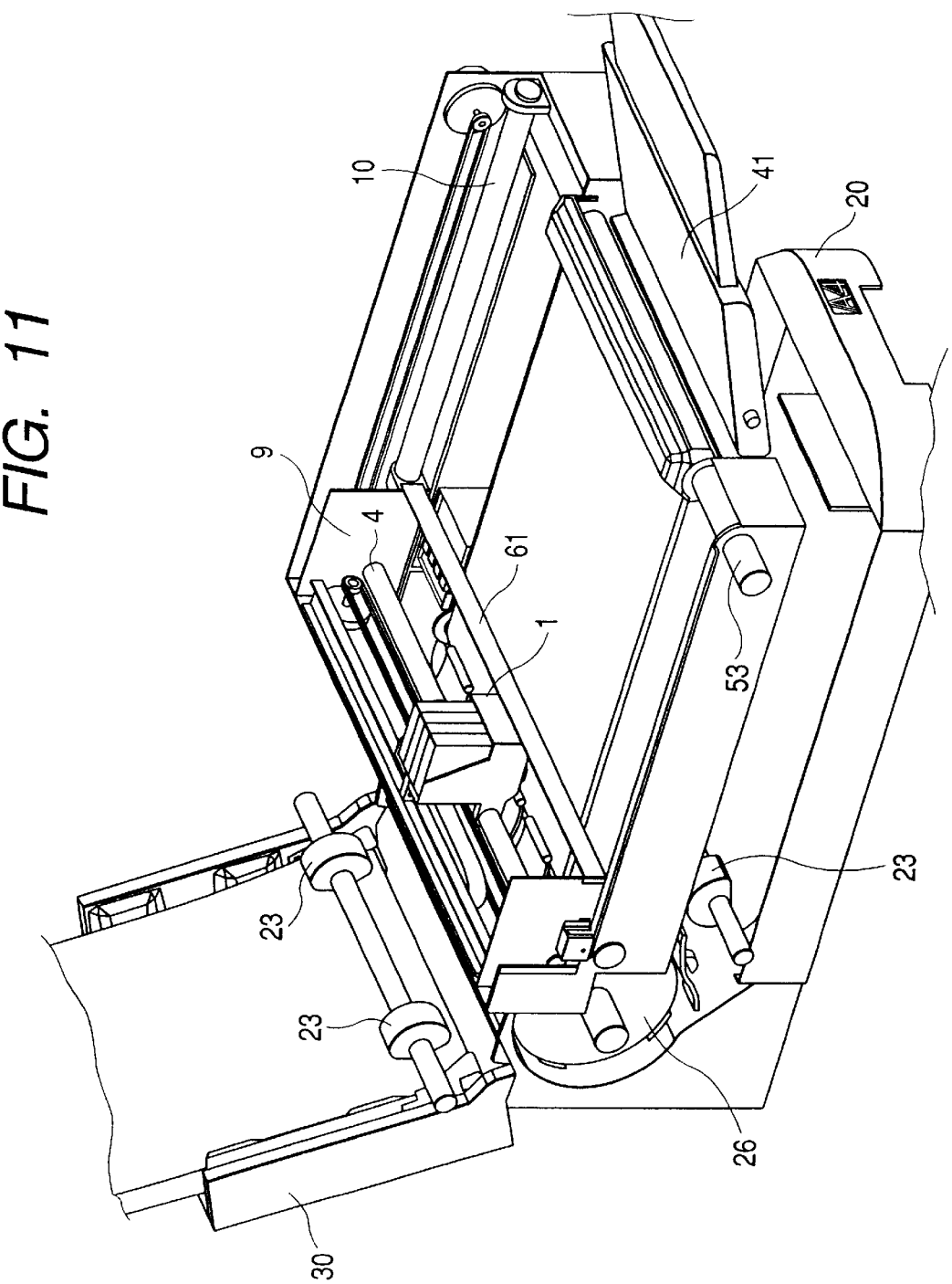
FIG. 11 is a perspective view which shows a variational example of the fourth embodiment which uses a line scanner.

In this respect, besides the scanner of the type that scans together with the carriage as shown in FIG. 9, it may be possible to use another type where a line scanner 61 is installed on the carriage frame 9 as shown in FIG. 11. This type has an advantage that the apparatus is made capable of reading at higher speeds, because only one scanning of the carriage frame 9 will suffice when images of one-page portion are read out.

Fifth Embodiment

Figure 13:
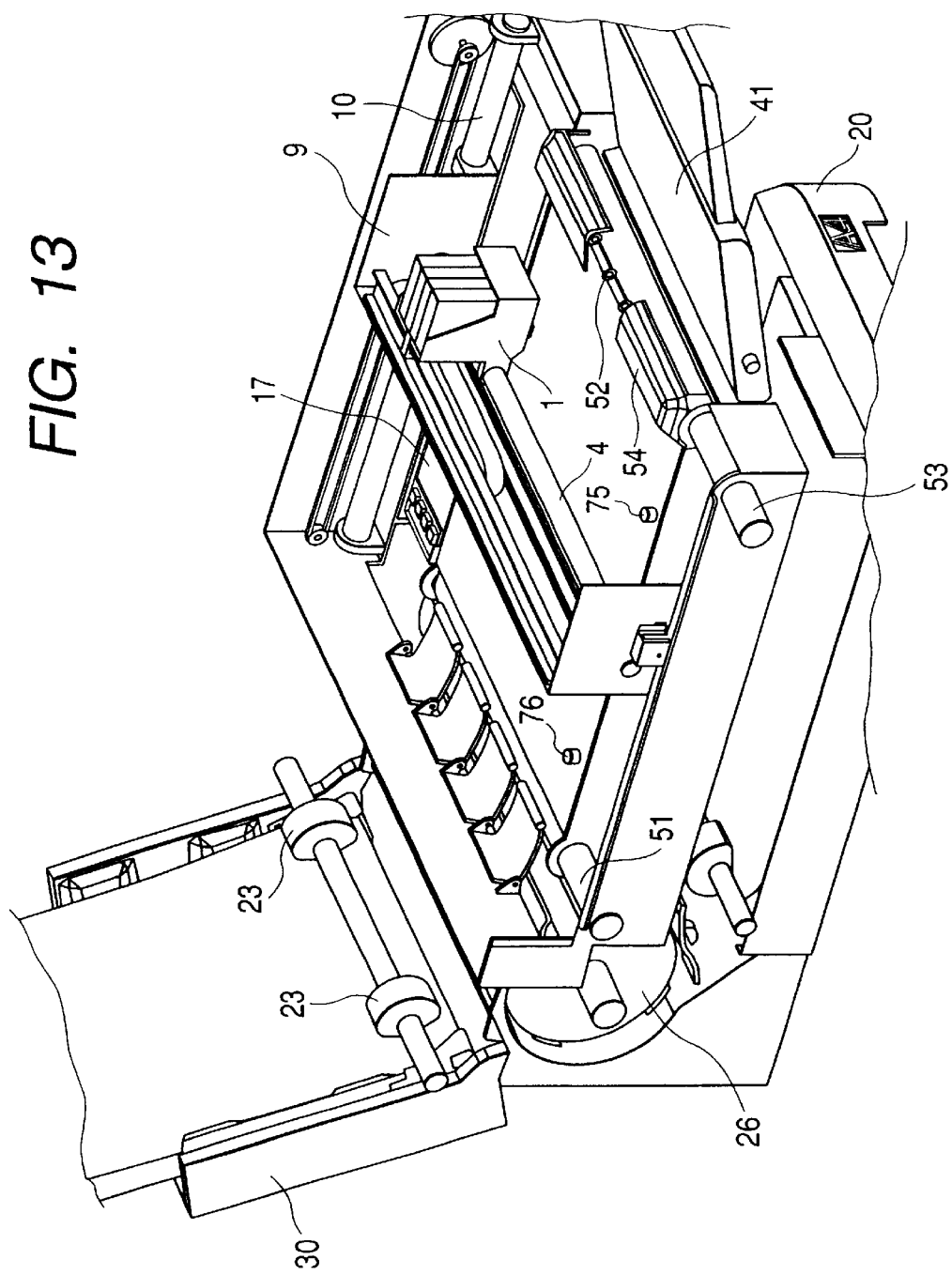
FIG. 13 is a perspective view which illustrates the entire body of the apparatus in accordance with the fifth embodiment.
Figure 14:
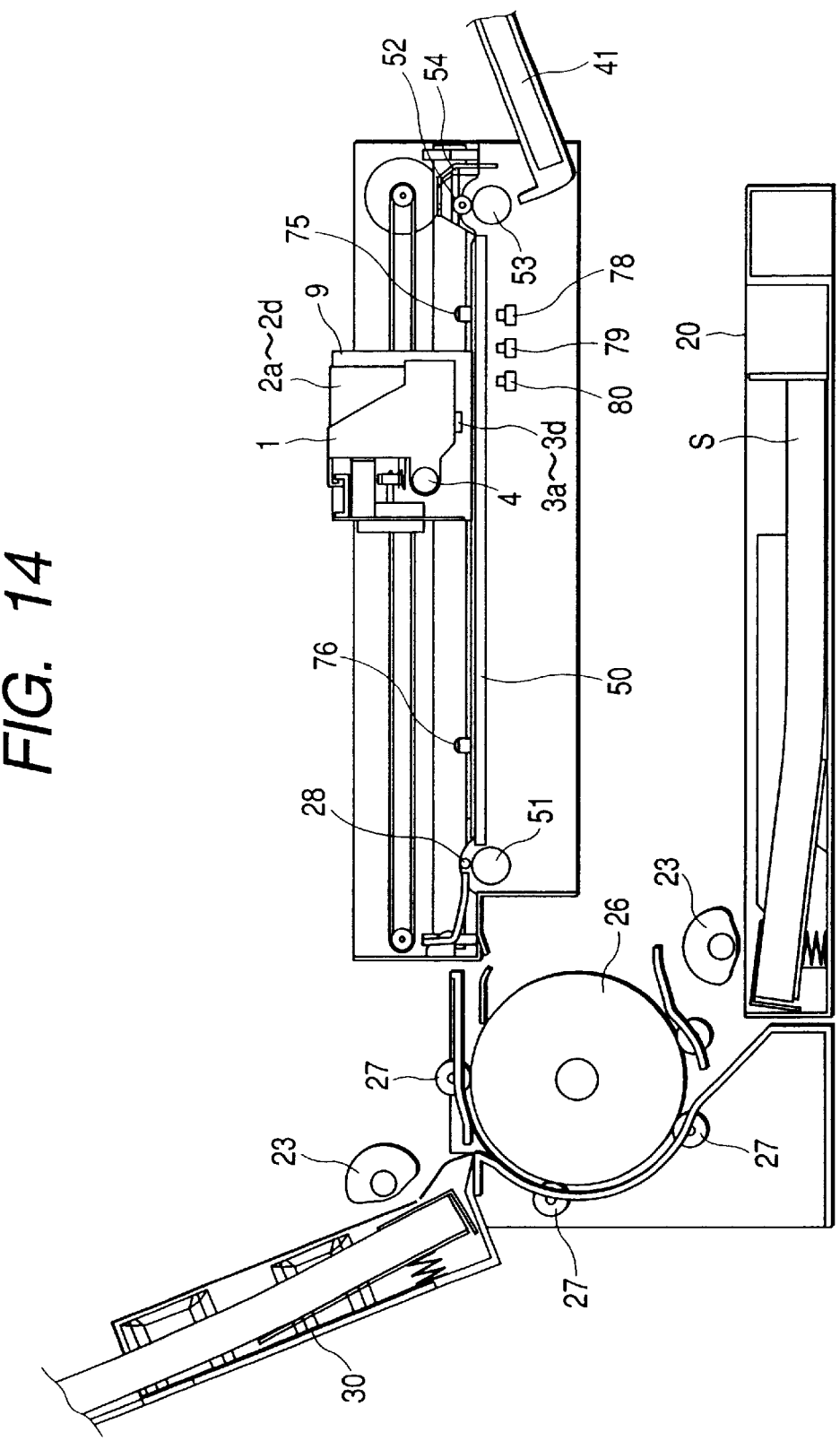
FIG. 14 is a sectional view which illustrates the apparatus in accordance with the fifth embodiment.
Figure 15:
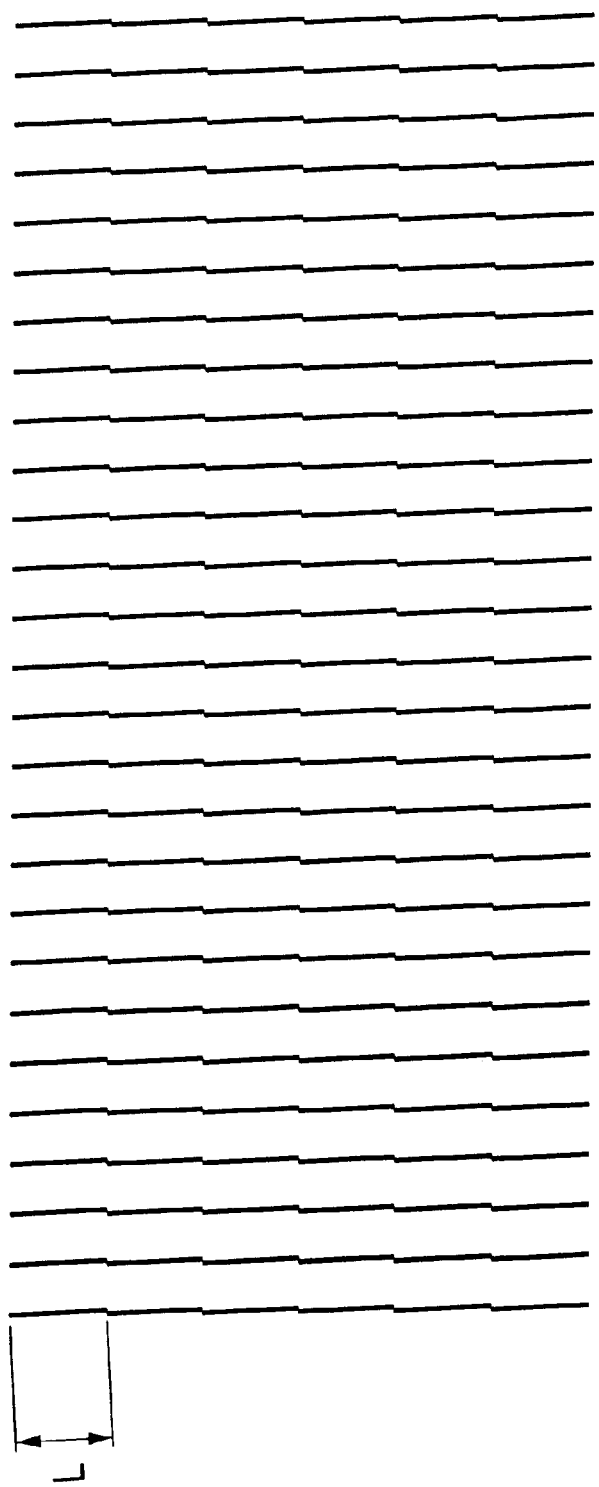
FIG. 15 is a view which illustrates the state where vertically ruled lines are diagonally continued by use of the conventional serial scanning recording apparatus.

Now, with reference to FIG. 12 to FIG. 14, a fifth embodiment will be described. FIG. 13 and FIG. 14 are views which illustrate the structure which is similar to that of the second embodiment described earlier. Therefore, any portions which are not particularly described otherwise are the same as those appearing in the second embodiment.

Figure 12:
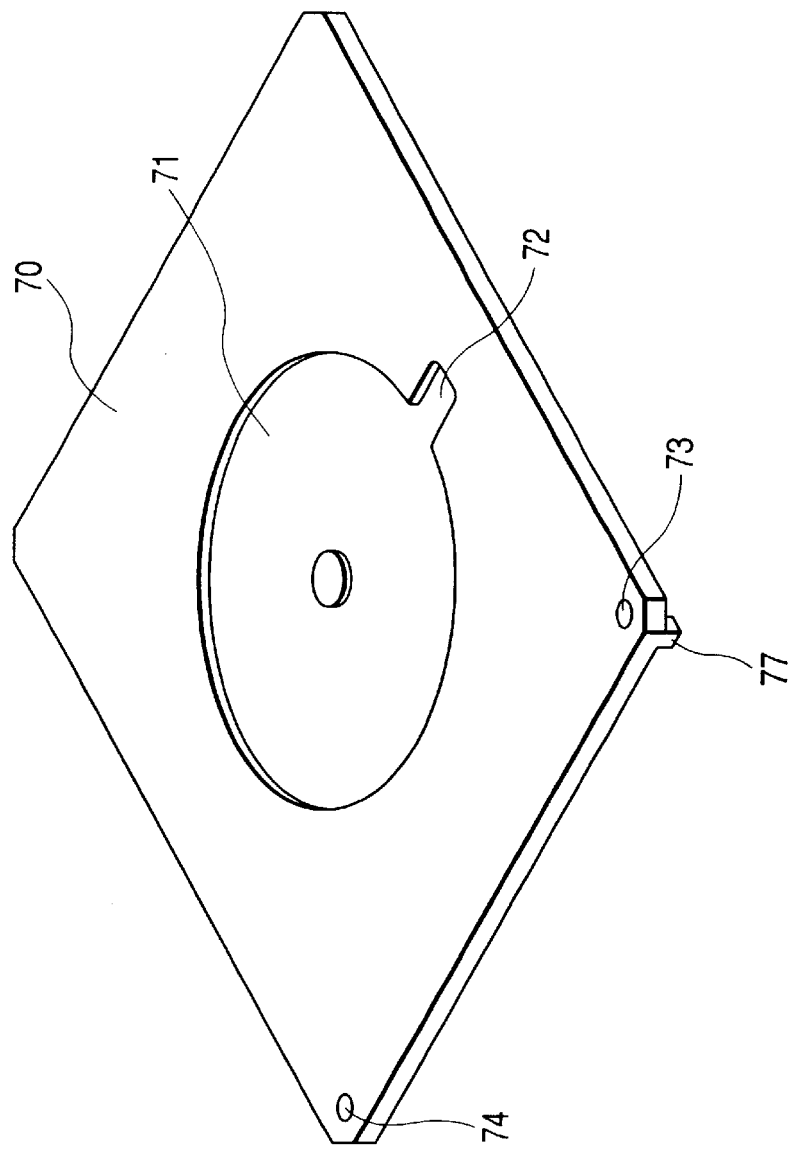
FIG. 12 is a perspective view which illustrates an attachment in accordance with a fifth embodiment.

FIG. 12 is a perspective view which illustrates an attachment, a characteristic component of the present embodiment. In FIG. 12, reference numeral 70 designates the attachment for use of CD-ROM recording. A CD-ROM is positioned on the recessed portion 71 of the attachment 70 for setting. Reference numeral 72 designates a cut out for use in picking up the CD-ROM. The pins 75 and 76 (see FIG. 13) which are fixed on the main body of a recording apparatus to be described later are inserted into a circular hole 73 and an elongated hole 74 so that the attachment 70 is positioned on the recording medium holding unit of the main body of the apparatus.

Reference numeral 77 designates an extrusion for use in discriminating the kind of attachment. Besides the attachment for use with a CD-ROM, those for a name card, and a cassette label are made available, that is, three kinds are prepared in total (the remaining two kinds are not shown). For each of the three kinds of attachments, the extrusion 77 for use in discriminating the attachment is arranged on different positions. In FIG. 13 and FIG. 14, reference numerals 75 and 76 designate the pins which are extruded from the stage 50, and the aforesaid circular hole 73 and the elongated hole 74 are fitted to them; further, reference numerals 78, 79, and 80 designate, switches for use in discriminating kinds of attachments. The switch 78 is depressed by the aforesaid extrusion 77 for use in discrimination of the attachment for use with a CD-ROM. The switch 80 is depressed for use of a name card. The switch 79 is depressed for use of a cassette label. Therefore, the kind of the attachment which is set can be discriminated by the switch which has been turned on.

Then structure is arranged so that in accordance with the result of such discrimination, control means (not shown) prohibits ink discharges to any portions other than a recording medium. Therefore, it becomes possible to prevent the apparatus from being stained by the erroneous setting that the use may make in this respect. Also, it is possible to implement high quality recording without any special operation or setting by controlling the discharge amount of ink and duty as well in accordance with each of the recording mediums.

Further, if it is required to change the distance between the orifice surface of the ink jet heads and the surface of the recording medium, it may be possible to install means for changing such distance, hence implementing the provision of an apparatus having good operability by controlling the aforesaid distance changing means with control means.

Sixth Embodiment

For the previous embodiments, the printer driver is described using the raster driver, but the present invention is applicable to a printer driver that uses page description language, such as postscript.

Also, the description has been made of the profile which is added to the header portion of the drawing function for the embodiments described earlier. On the header portion, however, it may be possible to store only the information used to read out the profile stored in a memory.

Also, it may be possible to arrange the structure so as to instruct manually whether or not the aforesaid recording control should be executed through the user interface of a printer driver.

Here, the present invention is applicable either to a system formed by plural equipment components (such as a host computer, an interface device, a reader, a recording apparatus, among some others) or to an apparatus formed as a single device (such as a copying machine or a facsimile machine, among some others).

Also, the present invention is construed to include in the scope thereof the programming codes of software which implement the functions of the embodiments described earlier, and which are provided for a computer in an apparatus or a system connected with various devices arranged for the implementation thereof, hence operating each of the devices by the computer (CPU or MPU) in such system or apparatus in accordance with the programming codes thus stored.

In this case, the aforesaid programming codes of the software themselves implement the functions of the embodiments. Therefore, the programming codes themselves, and means for supplying such programming codes to a computer, that is, the storage medium that has stored the programming codes, for example, are construed to constitute the present invention.

As a storage medium for storing such programming codes, it is possible to use a floppy disc, a hard disc, an optical disc, a optomagnetic disc, a CD-ROM, a magnetic tape, a non-volatile memory card, a ROM, or the like, for example.

Also, the present invention is construed of course to include not only the case where the functions of the aforesaid embodiments are implemented by a computer that executes the programming codes supplied thereto, but also, the case where the aforesaid embodiments are implemented by such programming codes in cooperation with the OS (Operating System) operating on the computer or with other application software or the like.

Further, the present invention is construed of course to include the case where the programming codes thus supplied are once stored on an expanded functional board or on a memory provided for an expanded functional unit connected with the computer, and then, the actual processes are executed partly or totally by the CPU or the like provided for such expanded functional board or functional storage unit in accordance with the instructions from the programming codes, hence implementing the functions of the aforesaid embodiments.

In accordance with the embodiments described above, recording is performed while the recording heads and means for holding a recording medium move relatively in the intersecting two directions, and at the same time, controls are each individually made as to form recording control means for executing recording controls with respect to the figure draw commands, such as drawing ruled lines, and bitmap recording control means for executing recording controls by means of bitmap developments of draw commands other than the aforesaid figure drawing commands. Thus, first, it becomes possible to materialize an ink jet recording apparatus which can output high quality images while neither creating deviating seams to the left or right nor creating black strips or white strips, because vertically or horizontally ruled lines, a table formed by lines, and other figures are recorded without creating seams.

Second, it becomes possible to reduce the creation of strips and unevenness in the recorded images that may occur as a drawback of a serial type recording apparatus, and obtain high quality images by executing the recording controls specially made to execute draw commands for basic figures, while executing the image data other than such draw commands with usual recording controls. Also, it becomes possible to prevent overlapped recording for the portion where figures are overlapped themselves, and to prevent ink from being impacted excessively more than the normal amount while exerting almost no extra load on the hardware as well, hence executing the required process in a desirable condition.

Third, unlike the conventional serial type recording apparatus, there is no need for repeating scans many times when an image of vertically ruled lines or the like is recorded. Therefore, the recording speed becomes faster. For the other images, the ink jet recording apparatus can implement recording at higher speeds, because recording time is minimized by controlling the operation of scanning means in the two directions.

Fourth, there is no need for the provision of a mechanism for carrying a recording medium in high precision so that smaller ink heads and a recovery device can be made at lower costs accordingly, hence making it possible to materialize a smaller ink jet recording apparatus at lower costs of manufacture.

Fifth, with the recording medium holding means which can be structured exactly on a flat surface, it becomes easier to set a thick and hard medium, such as a CD-ROM, a hard board, or a plastic plate, without a danger that the recording medium may be folded. Also, images can be recorded on a recording medium having a glossy surface, because it is not subjected to being affected by any unfavorable friction between rollers.

As a result, it becomes possible to materialize an ink jet recording apparatus capable of dealing with various recording media easily with high operability.

Sixth, with the image reading means which is provided for a carriage or with the line type reading means which is installed on a frame almost of the same length as the width of the recording medium holding means, it becomes possible to materialize a compact apparatus which can dually function to execute image reading and image outputting.

Seventh, with the attachment which is made detachably mountable on the recording medium holding means, positioning means for positioning this attachment on the recording medium holding means, and discriminating means for discriminating the kind of attachment, it is made possible to execute controls in order to prohibit ink discharges to any portions other than the surface of the recording medium installed on the attachment. Also, with the distance changing means that changes the distance between the orifice surface of an ink jet recording head and the surface of a recording medium, it is made possible to control the distance between them without the user's operation and setting, thus materializing an apparatus having an excellent operability.

What is claimed is:

1. An ink jet recording apparatus for recording by discharging ink from nozzles of a recording head to a recording medium, comprising:
    figure recording control means for executing recording control of figure draw commands for ruled lines and other figures; and
    bitmap recording control means for executing recording control of draw commands other than the figure draw commands by developing bitmaps, wherein
    draw commands are individually controlled by said figure and bitmap recording control means, respectively, and at the same time, recording is performed by relatively moving in two intersecting directions the recording head for discharging ink by the draw commands, and the recording medium held by recording medium holding means in a position facing an ink discharge surface of the recording head.

2. An ink jet recording apparatus according to claim 1, wherein the figure draw commands for ruled lines and other figures, and the drawing commands other than the figure draw commands are separated, and recording for the figure draw commands is performed in accordance with positional information and attributes thereof, and recording for the other draw commands is performed by bitmap development.

3. An ink jet recording apparatus according to claim 1, further comprising:
    draw command separation means for analyzing data in a page to be recorded and separating the figure draw commands contained in the page and the draw commands other than the figure draw commands;
    memory means for storing as bit information whether or not positions to be recorded by each draw command are recorded;
    recorded position writing means for transferring recording data in a significant order thereof for all the draw commands, and writing the recorded information on said memory means for the positions to be recorded by each draw command; and
    recording control means for comparing draw commands one after another with the recorded positional information on the memory means, and performing control so as not to record on an area having recorded positions.

4. An ink jet recording apparatus according to claim 1, wherein recording control is performed to record ruled lines on the recording medium if the figure draw commands contain ruled lines, and after that, images other than the ruled lines are recorded.

5. An ink jet recording apparatus according to claim 3, wherein one pixel is assigned to one bit for said memory means.

6. An ink jet recording apparatus according to claim 5, wherein for said memory means, all bit information is initialized at "1", and the recorded areas are stored as "0", and control is made so as not to record on the areas already recorded by operating AND with the areas having images drawn by each of the draw commands.

7. An ink jet recording apparatus according to claim 1, wherein said recording head is provided with nozzle arrays inclined relative to the two directions.

8. An ink jet recording apparatus according to claim 7, wherein the inclination is 45° relative to the two directions.

9. An ink jet recording apparatus according to claim 1, wherein said recording head is provided with two nozzle arrays parallel to the two directions, respectively.

10. An ink jet recording apparatus according to claim 1, further comprising:
    feeding means for feeding the recording medium to said recording medium holding means; and
    expelling means for expelling a recording medium from said recording medium holding means.

11. An ink jet recording apparatus for recording by discharging ink from the nozzles of a recording head to a recording medium, comprising:
    a carriage having the recording head to discharge ink in accordance with drawing signals, and being movable in a straight line;
    a frame having said carriage mounted thereon to be movable in a straight line in a direction intersecting with the moving direction of said carriage;
    recording medium holding means for holding the recording medium in a position facing an ink discharge surface of the recording head;
    figure recording control means for executing recording control of figure drawing commands for ruled lines and other figures; and
    bitmap recording control means for executing recording control of draw commands other than the figure draw commands by developing bitmaps,
    wherein draw commands are individually controlled by said figure and bitmap recording control means, respectively, and at the same time, recording is performed by relatively moving the recording head for discharging ink by the draw commands, and said carriage and said frame scan the recording medium held on said recording medium holding means by the draw commands, at the same time recording by discharging ink from the recording head in accordance with drawing signals.

12. An ink jet recording apparatus according to claim 11, wherein said carriage is provided with image reading means.

13. An ink jet recording apparatus according to claim 11, wherein said frame is provided with line type image reading means.

14. An ink jet recording apparatus according to claim 1, further comprising:

an attachment detachably mountable on said recording medium holding means, and being capable of positioning and holding the recording medium.

15. An ink jet recording apparatus according to claim 14, further comprising:

a plurality of attachments; and discriminating means for discriminating the kinds of said attachments.

16. An ink jet recording apparatus according to claim 15, further comprising:

control means for controlling in accordance with the result of discrimination by said discriminating means so as not to discharge ink to an area other than the recording medium held on one of said attachments.

17. An ink jet recording apparatus according to claim 15, further comprising:

control means for controlling in accordance with the result of discrimination by said discriminating means so as to discharge ink in accordance with the recording medium held by one of said attachments.

18. An ink jet recording apparatus according to claim 15, further comprising:

distance changing means for changing the distance between the ink discharge surface of the recording head; and control means for controlling said distance changing means in accordance with the result of discrimination by said discriminating means.

* * * * *